Feb. 13, 1951  P. M. G. TOULON  2,541,133
SYSTEM FOR CONTROLLING THE FLOW OF SUCCESSIVE
ELECTRICAL IMPULSES IN A CHANNEL
Filed April 3, 1947  2 Sheets-Sheet 1
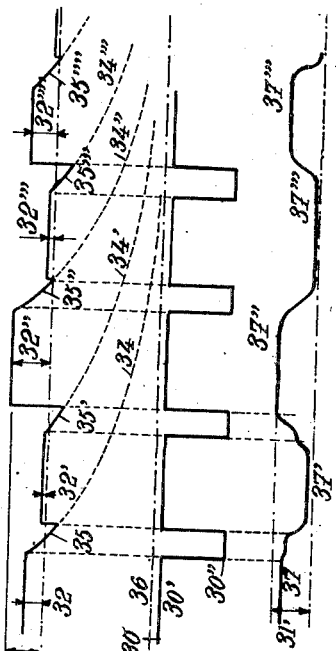
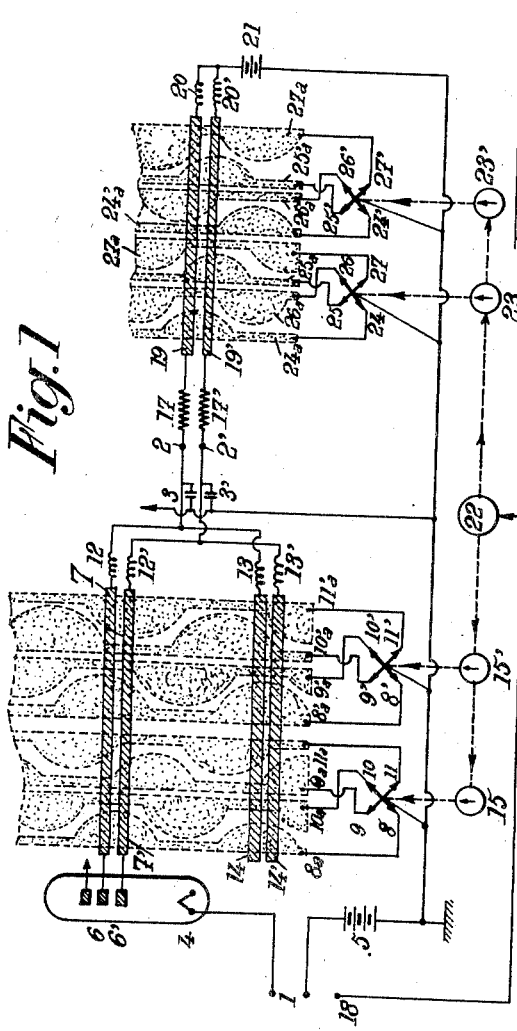
INVENTOR
PIERRE MARIE GABRIEL TOULON
BY
*Toulmin & Toulmin*
ATTORNEYS Feb. 13, 1951     P. M. G. TOULON     2,541,133
SYSTEM FOR CONTROLLING THE FLOW OF SUCCESSIVE
ELECTRICAL IMPULSES IN A CHANNEL
Filed April 3, 1947                          2 Sheets-Sheet 2

INVENTOR
PIERRE MARIE GABRIEL TOULON
BY
Toulmin & Toulmin
ATTORNEYS

Patented Feb. 13, 1951

2,541,133

UNITED STATES PATENT OFFICE 2,541,133

SYSTEM FOR CONTROLLING THE FLOW OF SUCCESSIVE ELECTRICAL IMPULSES IN A CHANNEL

Pierre Marie Gabriel Toulon, Neuilly-sur-Seine, France, assignor to Products & Licensing Corporation, New York, N. Y., a corporation of Delaware Application April 3, 1947, Serial No. 739,153
In France February 20, 1943

Section 1, Public Law 690, August 8, 1946
Patent expires February 20, 1963

22 Claims. (Cl. 332—13)

The present invention relates to electric impulse distributing systems of the type described in my U. S. patent application Ser. No. 213,289, filed June 11, 1938, and my copending U. S. applications Ser. No. 739,018, filed Apr. 2, 1947 for "Signal Distributing Systems" and Ser. No. 739,019, filed Apr. 2, 1947 for "Electrical Transmission Systems."

An object of my invention is to permit storing up, in each of the output channels, the successive impulses for a certain time in a condenser, after which said impulses are caused to flow out. For this purpose, I make use in particular of independent valves.

Another object of my invention is to provide a means for keeping each impulse stored up in the condenser and subsequently ensuring its quick outflow, after a given time. To this effect, according to a feature of my invention, I make use to charge this condenser of a valve tube or equivalent means, and means are provided to keep this condenser substantially at the same potential for a time and suddenly lowering this potential; said means advantageously include a resistance connected to said condenser and a source of periodically variable potential. This source of potential is preferably constituted by a complex voltage generator based upon the use of capacitors, as described in my above mentioned prior U. S. patent applications.

Still another object of my invention is to provide a device for supplying the electrodes in which the impulses are stored up with the necessary energizing voltages while facilitating the utilization of the charge after its storing up. This device includes means for producing a symmetrical compensating auxiliary voltage and rejector resistances or reactance coils.

According to a preferred embodiment, I make use, for each of the independent output channels, of two small condensers of equal capacities, respectively, supplied with energizing voltages (generally of complex shape with a very sharp maximum in the course of each period) which are equal and of contrary signs. These two small capacitors are connected together by means of two resistors (or two inductance coils) of equal values. One of the condensers is connected with the anode where the impulses are stored up, the other serves merely to supply a compensation voltage. The point of junction of these resistances (or inductance coils) is connected with the utilization circuit. In this circuit, the influence exerted by the energizing distribution is zero, since the two condensers supply equal and opposed currents; but the impulse that is stored up in the anode can, on the contrary, be utilized without perturbation.

The main energizing voltage and the auxiliary voltage may be of different values, provided that the values of the capacitors are inversely proportional. According to a modification of my invention, I make use of a neutral point (or multiple terminal) transformer for obtaining the same result. When rejector inductance coils are employed, the whole of the inductance coil and capacitor may be tuned to enter into resonance with the highest frequency of the sensitizing voltage. The symmetrical compensation voltage is preferably obtained through a system of capacitors made according to the principle set forth in my above prior U. S. applications.

Preferred embodiments of my invention will be hereinafter described with reference to the accompanying drawings, given merely by way of example and in which:

Fig. 1 is a general view of a distribution system according to the present invention;

Fig. 2 is a curve giving, as a function of time, the shape of the voltage induced in one of the anodes, and the compensation voltage;

Fig. 3 shows, as a function of time, the shape of the voltage obtained in one of the output circuits, for different values of the discharge resistance;

Fig. 4 illustrates the advantage obtained in periodically modifying the potential at the end of this resistance according to the principle of my invention;

Figure 5:
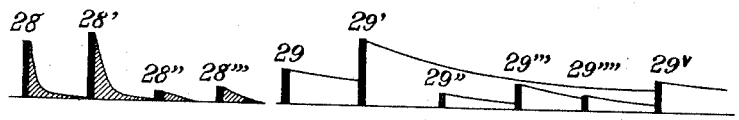
Fig. 5 shows how the desired voltage can be obtained by synthesis, through a suitable choice of amplitude and phase (application of the decomposition of a periodic function into Fourier's series)
Figure 5:
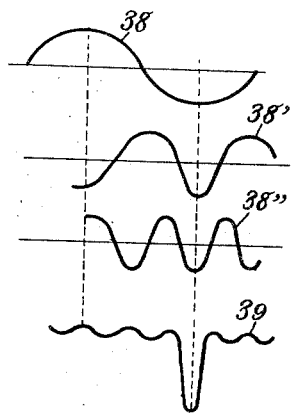

In Fig. 1, I have shown at I the single input channel through which the impulses to be distributed arrive at a high rate, and at 2, 2', etc., the terminals of the independent output channels to which the output voltages (with reference to the earth) are fed after distribution.

4 is the common cathode which receives the impulses from the input channel constituted by line I and 6, 6', etc., are the successive anodes for storing up the impulses. Each output channel or utilization circuit 2, 2', etc., is connected with a conductor strip 7, 7', etc., associated with an anode, respectively. Passage of the impulses to the respective output channels is obtained by successively inducing in said anodes 6, 6', etc., a given potential relation with respect to cathode 4. This given potential relation corresponds in fact to the passage through a sharp maximum of the periodically varying voltage imparted to each of said anodes 6, 6', etc., through the corresponding conductor strip 7, 7', etc. These periodically varying voltages are imparted to the respective conductor strips 7, 7', etc., so as to cause them to pass successively through said maximum. For instance, the curve representing the voltage in anode 6 as a function of time is shown at 16 on Fig. 2. Likewise, curve 16' represents the voltage which is induced in the next anode 6', and which is of the same shape as the preceding one but with a time lag with respect thereto. These induced voltages are obtained by superposing in said strips 7, 7', etc., several alternating currents of different respective frequencies and phases. For this purpose, the strips in question are arranged to act as capacitor plates cooperating with a set of opposed capacitor plates constituted by conductor strips 8a, 9a, 10a, 11a, and 8'a, 9'a, 10'a, 11'a (formed by ogive-shaped deposits on a sheet of insulating material) extending transversely to strips 7, 7', etc., the whole constituting a kind of multiple capacitor. Polyphase (four-phase) currents of different frequencies are supplied from oscillators 15 and 15' and through distribution devices 8, 9, 10, 11 and 8', 9', 10', 11' to strips 8a, 9a, 10a, 11a and 8'a, 9'a, 10'a, 11'a which can therefore be considered as "primary" strips inducing, by capacity effect, the desired complex voltages 16, 16', etc. (Fig. 2), in the "secondary" strips 7, 7', etc. The frequencies of the currents fed at 15, 15', etc., are multiplies of the main frequency (which, in the case of television, is the line scanning frequency); and for this purpose oscillators 15, 15' are synchronized with oscillator 22, itself controlled by the synchronization signals. In Fig. 1, these synchronization signals are supposed to arrive through line 18.

According to a feature of my invention, instead of collecting through a mere rejector resistance the successive impulses stored up in strips 7, I make use of inductance coils 12, 12', etc., as rejector means. On the other hand, I employ supplementary strips 14, 14', etc. forming condenser plates of capacities equivalent to those of 7, 7' but suitably positioned with respect to conductor deposits 8, 9, 10, 11, 8', 9', 10', 11' to compensate the influence produced by the anode energizing voltages in the utilization circuit. The voltage induced in capacitor plate 14 is equal and opposed (or proportional) to that induced in the corresponding capacitor plate 7. It is shown at 16₁ on Fig. 2. Likewise, the voltage induced in capacitor plate 14' is equal and opposed to that induced in capacitor plate 7, as represented at 16'₁ on Fig. 2.

Utilization circuit 2 (which may eventually be associated with a capacitor 3 intended to increase the time constant) is connected to a capacitor plate 7 through inductance coil 12, where as it is connected with capacitor plate 14 through inductance coil 13: as the capacities and voltages are equal and opposed (or proportional) no current is produced in circuit 2 as a result of the combined actions of oscillators 15 and 15'. In a likewise manner, utilization circuit 2' (associated with capacitor 3') is connected through inductance coil 12' to capacitor plate 7' and through inductance coil 13' to capacitor plate 14' so that no parasitic induction occurs in line 2'. And the same is true for each of the other independent output channels, not shown by the drawing, but connected in an analogous manner.

According to another feature of my invention, I provide means for prolonging the duration of the impulse received in each independent output channel for an important portion of the time that elapses between the passage of two successive impulses through this channel. An embodiment of these means is shown by Fig. 1 by way of example.

17, 17', etc., are resistances adapted to permit the gradual flow of the successive charges supplies from the respective anodes. Now, instead of being merely connected with the ground, the end of each of these resistances is supplied with a periodically varying voltage with a view to ensuring first a rational (that is to say a very slow), flow of the charge during most of the period, and then an extremely quick one. For this purpose, resistances 17 are connected to respective capacitor plates 19, 19', etc., cooperating with two sets of conductor strips 24a 25a, 26a, 27a and 24'a, 25'a, 26'a, 27'a forming corresponding capacitor plates (in the same manner as above described for strips 7, 7', etc., and conductor deposits 8, 9, 10, 11, 8', 9' 10', 11'), these sets of conductor strips being fed with four-phase currents from oscillators 23 and 23' respectively through distribution means 24, 25, 26, 27 and 24', 25', 26', 27'. Coil 20, connected with the earth (through a polarization battery 21) ensures the outflow of the charge. Oscillators 23 and 23' are synchronized with oscillator 22.

The advantage obtained by periodically modifying in a predetermined manner the potential at the end of each resistance 17, 17', etc. appears clearly from Figs. 3 and 4 which give, as a function of time, the voltage and current in the different portions of the circuit. Fig. 3 relates to the fixed potential discharge method used up to this time. I have shown at 28, 28', 28'', 28''' the successive impulses received in the utilization condenser (condenser 3 of Fig. 1 if it is supposed that resistances 17, 17' are directly connected to the earth). If the discharge of the condenser is to be complete when the next impulse comes in, it is necessary to make use of a very small discharge resistance (resistance 17 connected with the earth); but in this case the utilization of the stored up signal becomes very defective since the area of the hatched portion is very small due to the asymptotic decrease of the current.

On the contrary, if it is endeavored to prolong the duration of the impulse that is stored up and to improve the utilization thereof by giving resistance 17 (connected with the earth) a high value, the discharge is no longer complete and the successive impulses received in each of the channels will overlap one another. This is also shown by Fig. 3 where 29, 29', 29'', 29''', 29'''' are successive impulses obtained in this way. It is plain that while this does not matter only as long as the successive impulses have increasing values (such as impulse 29' succeeding to 29), it is no longer acceptable if the successive impulses have irregularly varying amplitudes, which is the most general case (impulses 29'', 29''', 29'''' coming after an impulse 29' of great amplitude).

According to my invention, the potential at the end of resistance 17, instead of remaining stationary (due to its being connected with the earth) is given, through system 19, 19, etc., 24a, 25a, 26a, 24'a, 25'a, 26'a, 27'a, 23, 23', a periodically varying value as shown at 30', 30" in Fig. 4; the upper voltage level 30' delays the discharge, whereas the lower level 30" produces a very quick discharge.

On Fig. 4, I have shown at 31 the amplitude of variation of the stored up impulses. 32, 32', 32", 32''', 32'''' are successive impulses. I determine the value of level 30' in such manner as to correspond to the mean level of the impulses (half-way of amplitude 31), whereby, as long as this level 30' is maintained, there is practically no discharge. Due to the superimposition of voltage 30', the low value impulse voltages, such as 32', will undergo a slight increase during this interval, while the high value impulse voltages will be slightly reduced. But when the superimposed potential suddenly assumes a negative value 30", the total voltage decreases very quickly. I have shown at 34, 34', 34" etc. these asymptotic decreases and at 36 the limit value. The potential in the output channel then follows the curve 32, 35, 32', 35', 32", 35", 32''', 35''', 32'''', 35'''', etc. Fig. 4 shows the value of this voltage after a first filtering. 31' is the maximum amplitude and 37, 37', 37'', 37''', 37'''' the successive mean values. No interference of a signal with the next one is to be feared and the utilization of the signals in the output channel is excellent.

As above stated, in order to obtain the desired voltage variation at the end of each of the many resistances 17, 17' etc., I make use of a complex voltage generator as show at 23, 23', 24, 25, 26, 27, 24', 25', 26', 27', 24a, 25a, 26a, 27a, 24'a, 25'a, 26'a, 27'a, 19, 19', etc. Instead of the rectangular shape of curve 30', 30", I preferably use a curve 39 (Fig. 5) having a sufficiently similar shape and resulting from the superposition to one another of the first terms of a "Fourier series" decomposition of this curve. For instance, by superposing the main term (sinusoid 38) and its first harmonic (sinusoid 38') or both of its two first harmonics (sinusoid 38") I obtain a curve 39 which is quite satisfactory in practice (Fig. 5). This voltage is induced in the strips 19, 19' of Fig. 1 by means of four-phase distribution means 24, 25, 26, 27 and 24', 25', 26', 27'; inductance coils 20, 20' act as rejector elements. Battery 21 ensures the suitable mean potential, and oscillators 23 and 23' are synchronized with heterodyne 22.

Figure 6:
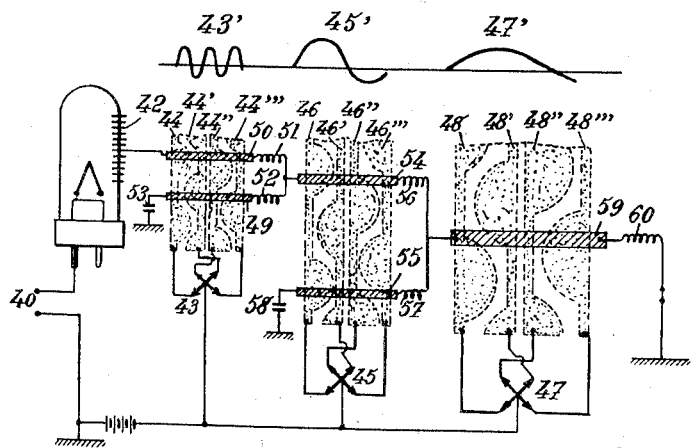
Fig. 6 shows how it is possible easily to induce in a conductor a periodical voltage resulting from the sum of frequencies very different from one another.

Fig. 6 shows a generalization of the arrangement of Fig. 1 which is particularly interesting if the respective frequencies of the voltages supplied to the various voltage distribution devices are very different from one another. In Fig. 6, I have shown at 43 the first four-phase distribution device and at 43' the curve of voltage as a function of time in one of the phases of this distribution device. I have likewise shown at 45 the second four-phase distribution device and at 45' the corresponding voltage curve, at 47 the third voltage distribution device and at 47' the corresponding voltage curve. The method therefore applies when frequency 45' is high with respect to 47' and 43' is high with respect to 45'. I have diagrammatically shown at 48', 48", 48''' some of the primary conductor strips connected with distribution device 47 and at 59 one of the corresponding secondary strips, at 46, 46', 46", 46''' some of the primary strips connected with distribution 45 and at 54 and 55 two secondary strips in phase opposition, at 44, 44', 44", 44''' some of the primary strips connected with distribution 43, and at 49 and 50 two corresponding secondary strips in phase opposition. According to my invention, each of the secondary strips is provided with individual rejector means such as an inductance coil (or a resistance). Strip 50 is connected with strip 54 through inductance coil 51. Likewise, strip 49 in phase opposition with 50 is also connected with strip 54 through coil 52. Strip 50 is connected with one of the anodes 42 of a multiple anode rectifier for distributing impulse and the cathode 41 of which receives modulation 40. The capacity of anode 42 is balanced with respect to the earth by means of a capacitor 53. In these conditions, conductor 54 is not influenced by distribution means 43.

In a like manner I balance by means of capacitor 58 the whole of the currents supplied with respect to the earth through 42, 53, 50 and 49. Conductor 59 is not influenced by distribution device 45. Conductor 59 is in turn connected through inductance coil 60 with the earth. The presence of inductance coils 51, 52, 56, 57 has for its effect considerably to reduce the power (either reactive or real) supplied through current distributions 43, 45 and 47. Although frequencies 43', 45' and 47' are very different from one another, it is possible, through the use of a relatively small energy, to induce in each of the conductors 42 a complex voltage of high amplitude according to the method described in the parent patent.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A system for distributing successive impulses of a periodically recurring group of impulses from a single input channel to a plurality of independent output channels which comprises, in combination, a set of insulated conductors corresponding each to one of said output channels, respectively, means for inducing in each of said conductors periodic voltage variations at the periodicity of said groups and having one sharp maximum in each of said periods and the succession of maxima in the respective conductors in synchronism with the flow of impulses in said input channel, means for transmitting each incoming impulse from said input channel to that one of said conductors which is passing through its voltage maximum during the impulse, a set of auxiliary conductors corresponding one for one with the first mentioned conductors, respectively, means for producing in each of said auxiliary conductors a voltage in phase opposition with the voltage in its corresponding first mentioned conductor, and decoupling means for connecting a point of each output channel to the corresponding first mentioned conductor and to the auxiliary conductor in phase opposition therewith, respectively.

2. A system for distributing successive impulses from a single input channel to a plurality of independent output channels which comprises, in combination, a set of insulated conductors corresponding each to one of said output channels, respectively, means for inducing in each of said conductors periodic voltage variations, respectively, with one sharp maximum in each period and with successive maxima in different ones of the respective conductors occurring in synchronism with the flow of impulses through said input channel, means for tranmitting each incoming impulse from said input channel to that one of said conductors which is concurrently passing through its voltage maximum, a set of auxiliary conductors one corresponding with each of said first mentioned conductors, respectively, means for producing in each of said auxiliary conductors a voltage variation in phase opposition with the voltage variation in the corresponding first mentioned conductor, and separate inductance coils for connecting a point of each output channel to the corresponding first mentioned conductor and to the auxiliary conductor in phase opposition therewith, respectively.

3. A system for distributing successive impulses from a single input channel to a plurality of independent input channels which comprises, in combination, a set of insulated primary conductor strips, a set of insulated secondary conductor strips extending transversely to the strips of the first set and only capacitively coupled therewith, means for applying to each of said respective primary strips with at least one polyphase alternating voltage, said primary strips being so shaped as to induce in said secondary strips, by said capacitive coupling, periodic complex voltage variations respectively with one sharp maximum in each period and with successive maxima in the respective secondary conductor strips occurring in synchronism with the flow of impulses through said input channel, means for transmitting each incoming inpulse from said input channel to that one of said secondary conductor strips which is concurrently at its voltage maximum, a set of auxiliary secondary conductor strips, each corresponding to one of said first mentioned secondary conductor strips, means for imparting to each of said auxiliary secondary conductor strips a voltage variation in phase opposition with the voltage variation in the corresponding one of the first mentioned secondary conductor strips, respectively, and separate decoupling means for connecting a point of each output channel to one secondary conductor strip and to the corresponding auxiliary conductor strip.

4. A system for distributing successive impulses from a single input channel to a plurality of independent input channels which comprises, in combination, a set of insulated primary conductor strips, a set of insulated secondary conductor strips extending transversely to the strips of the first set and capacity coupled therewith, means for supplying the respective primary strips each with at least one polyphase alternating current, said primary strips being so shaped as to induce in each of said secondary strips, by said capacitive coupling, a periodic complex voltage variation with one sharp maximum in each period and with a succession of the maxima occurring in the respective secondary conductor strips in synchronism with the flow of impulses through said input channel, means for transmitting each incoming impulse from said input channel to that one of said secondary conductor strips which is concurrently at its voltage maximum, a set of auxiliary secondary conductor strips so capacitively coupled with said primary conductor strips that on each of said auxiliary secondary strips is imparted a voltage variation in phase opposition with the voltage variation in a corresponding one of the first mentioned secondary conductor strips, and separate inductance coils for connecting a point of each output channel to one secondary conductor strip and to the auxiliary conductor strip in phase opposition therewith, respectively.

5. A system for distributing successive impulses from a single input channel to a plurality of independent output channels which comprises, in combination, a set of insulated conductors corresponding each to one of said output channels, respectively, means for inducing in said conductors periodic voltage variations respectively, said voltage variations each having one sharp voltage maximum in each period, and succession of the maximums occurring successively in the respective conductors in synchronims with the flow of impulses through said input channel, means for transmitting each incoming impulse from said input channel to that of said conductors which is concurrently passing through its voltage maximum, a resistance connected between each of said conductors and the corresponding output channel, a separate capacitor connected between ground and that end of each of said resistances which is directly connected with the corresponding conductor, and means for applying to the other end of each of said resistances a voltage varying periodically in synchronism with the flow of impulses through the output channel associated with said resistance and equal substantially to the mean value of the impulse voltages, and means for reducing said voltage at the end of each of said periods to a value greatly below said mean value.

6. A system according to claim 5 in which the means for applying to the second mentioned end of each of said resistances a periodically varying voltage includes a set of insulated secondary conductor strips connected each to an end of one of said resistances, respectively, a set of insulated primary strips extending transversely to the strips of said first set and capacitively coupled therewith, and means for supplying each of said respective primary strips with at least one polyphase alternating voltage in synchronism with the flow of impulses through said input channel.

7. In a system of the kind described, the combination of a single input channel supplied with successive electrical impulses, a plurality of independent output channels, a set of conductors connected each to one of said output channels, respectively, means for distributing the incoming impulses from said input channel to said conductors successively, a capacitor and a further impedance inserted between ground and each of said conductors, and means connected between said further impedance and ground for imparting to each of said conductors through its corresponding further impedance, a voltage varying during the time interval between two successive impulses flowing through the output channel associated with said conductor, for most of the duration of said time interval, equal to the mean value of the impulse voltages, to prevent discharge, through said impedance, of the last impulse received and, at the end of said interval, substantially below said mean voltage value, to enable rapid discharge of said capacitor.

8. In a system of the kind described, the combination of a single input channel supplied with successive electrical impulses, a plurality of independent output channels, a set of conductors corresponding each to one of said output channels respectively, means for distributing the incoming impulses from said input channel to said conductors successively, a resistance inserted between each of said conductors and ground, a capacitor inserted connected between ground and that end of each of said resistances which is directly connected with the corresponding conductor, and means for applying to the other end of each of said resistances, a voltage wave varying during the time interval between two successive impulses flowing through the output channel associated with said resistance so as to be, for most of the duration of said time interval, equal to the mean value of the impulse voltages, thus preventing discharge through said resistance of the last impulse received, and, at the end of said interval, well below said mean value, to effect rapid discharge of said condenser.

9. In a pulse lengthening system, a series circuit comprising a two terminal condenser, a discharge resistance for said condenser, a common point on said series circuit, one terminal of said condenser connected to said common point, means for applying a voltage pulse of one polarity directly to the other terminal of said condenser to charge said condenser to the full voltage of said pulse, a source of discharge voltage pulse of polarity opposite to said first polarity, and means for applying said discharge voltage pulse to discharge said condenser via said resistance, said resistance and condenser having a sufficiently long time constant to prevent substantial discharge of said condenser through said series circuit during the time interval intermediate said pulses.

10. The combination in accordance with claim 9 wherein is further provided a source of D.-C. steady charging voltage in said series circuit, said D.-C. steady voltage having substantially one half the amplitude of said first mentioned pulse.

11. In a pulse lengthening system, a source of periodic storing pulses of variable voltage, a storage condenser, means for charging said condenser in response to each of said periodic storing pulses to the full amplitude of said each of said storing pulses, a source of periodic discharge pulses, each of said discharge pulses occurring just antecedent to one of said storing pulses, said discharge pulses each of substantially one amplitude, a relatively high resistance, and means for applying said discharge pulses to said condenser via said relatively high resistance.

12. The combination in accordance with claim 11 wherein is further provided means continuously tending to charge said storage condenser to a voltage equal to the average of said series of storing pulses.

13. In a pulse lengthening system, a source of periodic storing pulses of variable voltage and first polarity, a condenser, a circuit of negligible resistance for charging said condenser in response to each of said storing pulses to the full voltage of said each of said storing pulses, a source of discharge pulses of second polarity opposite to said first polarity and of uniform voltage, said pulses of second polarity occurring each immediately antecedent one of said storing pulses, a relatively high resistance, and means for applying said discharge pulses to said condenser via said relatively high resistance, said relatively high resistance having sufficient magnitude to prevent substantial discharge of said condenser in the interval between any successive storing and discharge pulse.

14. The combination in accordance with claim 13 wherein is further provided a source of steady D.-C. voltage connected to charge said condenser via said relatively high resistance to a value substantially midway of the peak value of said periodic storing pulses.

15. In a pulse lengthening system, a source of periodic pulses of variable amplitude, a condenser, means for charging said condenser in response to each of said pulses to the full amplitude of said each of said pulses, a source of periodic discharge pulses for said condenser, one of said discharge pulses occurring antecedent to each of said first mentioned pulses, a discharge resistor connected in series between said condenser and said source of periodic discharge pulses for said condenser, said condenser and said discharge resistor having a time constant and said discharge pulses having an amplitude, such that said condenser is rapidly discharged only in response to each of said discharge pulses.

16. The combination in accordance with claim 15 wherein is further provided means normally tending to maintain said condenser charged to the mean value of said pulses of variable amplitude.

17. In a system for distributing impulses, a source of recurrent pulses of a first polarity and variable amplitude, a condenser, means for applying said pulses to charge said condenser in said first polarity, a source of pulses of second polarity opposite said first polarity and of uniform amplitude, a relatively high resistance, and means for applying each of said pulses of second polarity via said resistance to charge said condenser in said opposite polarity at times intermediate each pair of said first pulses.

18. In a system for distributing impulses, a source of impulses of one polarity, a condenser, a resistance, a source of D.-C. voltage, means for applying said impulses of one polarity to charge said condenser, a switch, and means responsive to closure of said switch for connecting said source of D.-C. voltage to charge said condenser in opposite polarity through said resistance.

19. A system for distributing successive impulses of a periodically recurring group of impulses of variable amplitude from a single input channel to a plurality of independent output channels which comprises, in combination, a set of conductors corresponding each to one of said output channels, a separate condenser connected between each of said conductors and a common point, means for distributing separate ones of said impulses to separate ones of said conductors to charge said condensers substantially instantaneously each to a voltage corresponding with the amplitude of one of said impulses, a source of periodically recurring discharge pulses for said condensers, said discharge pulses of substantially uniform amplitudes, a plurality of relatively high resistances, means for distributing said discharge pulses to said condensers via said resistances, each discharge pulse to a different one of said condensers via a different one of said resistances, said resistances having such relation to the capacities of said condensers and the amplitudes of said discharge pulses as to effect storage of said impulses and relatively rapid discharge in response to said discharge pulses.

20. The combination in accordance with claim 19 wherein is further provided a source of D.-C. steady voltage for continually charging said condensers through said resistances to a value less than the maximum value of said impulses of variable amplitude.

21. In a pulse lengthening circuit, a series circuit comprising a condenser and a relatively high resistance in series, means for applying directly across said condenser periodic pulses of variable amplitude, each of said pulses charging said condenser to a voltage corresponding with its total amplitude, said condenser and resistance having a sufficiently long time constant in relation to the time intervals between successive pulses to prevent substantial discharge of said condenser during said time intervals, a source of periodic discharge pulses for said condenser, means for applying said discharge pulses in series with said condenser and said resistance, said discharge pulses having each sufficient amplitude radically to alter the charge of said condenser through said resistance.

22. The combination in accordance with claim 21 wherein is further provided in said series circuit a source of steady D.-C. voltage having a value approximately equal to the average of said periodic pulses of variable amplitude, and poled in a sense to tend to charge said condenser through said resistance.

PIERRE MARIE GABRIEL TOULON.

REFERENCES CITED

The following references are of record in the file of this patent:

UNITED STATES PATENTS

| Number | Name | Date |
|---|---|---|
| 1,760,159 | Mathes | May 27, 1930 |
| 1,957,815 | Baird | May 8, 1934 |
| 1,932,606 | Schramm | Oct. 31, 1943 |

FOREIGN PATENTS

| Number | Country | Date |
|---|---|---|
| 462,877 | Great Britain | Mar. 17, 1937 |
| 523,263 | Great Britain | July 10, 1940 |